(12) United States Patent
Tellez et al.

(10) Patent No.: US 12,286,064 B2
(45) Date of Patent: Apr. 29, 2025

(54) DOOR TRIM SECONDARY ATTACHMENT

(71) Applicant: GM GLOBAL TECHNOLOGY OPERATIONS LLC, Detroit, MI (US)

(72) Inventors: Erick Asgard Tellez, Estado de Mexico (MX); Reynaldo Godinez, Toluca (MX)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 507 days.

(21) Appl. No.: 17/687,933

(22) Filed: Mar. 7, 2022

(65) Prior Publication Data

US 2023/0278504 A1 Sep. 7, 2023

(51) Int. Cl.
*B60R 13/02* (2006.01)

(52) U.S. Cl.
CPC ...... *B60R 13/0206* (2013.01); *B60R 13/0243* (2013.01); *B60R 2013/0287* (2013.01); *B60R 2013/0293* (2013.01)

(58) Field of Classification Search
CPC ............ B60R 13/0206; B60R 13/02; B60R 2013/0287; B60R 2013/0293; B60R 13/0243
USPC ........................................ 296/1.08
See application file for complete search history.

(56) References Cited

U.S. PATENT DOCUMENTS

| 8,646,827 | B2 * | 2/2014 | Zimmerman | ....... B60R 13/0256 296/72 |
| 9,199,585 | B2 * | 12/2015 | Balla | ................... B60R 13/0206 |

* cited by examiner

*Primary Examiner* — Daniel J Colilla
(74) *Attorney, Agent, or Firm* — CANTOR COLBURN LLP

(57) ABSTRACT

A trim assembly of a vehicle includes a first component, a second component, and one or more primary retention elements attaching the first component to the second component. A secondary retention element is located at the first component. The secondary retention element is configured to engage the second component only in the event that the first component begins to move away from the second component to prevent release of the first component.

14 Claims, 9 Drawing Sheets

ND TRIM SECONDARY ATTACHMENT

INTRODUCTION

The subject disclosure relates to vehicle interior trim, and more particularly to installation and retention of interior door trim components of a vehicle.

Vehicle interiors, such as doors, have trim pieces installed onto body panels in order to improve, for example, appearance and or functionality of the door interior. The trim pieces, in particular, the door trim pieces are typically installed using a combination of screws and melted studs as primary retention, and in some configurations a hook feature on the trim piece as a secondary retention during an impact situation to prevent the trim piece from releasing into the passenger cabin of the vehicle.

Installation of the trim piece having the hook feature requires a "hook and swing" type of assembly, which increases complexity of the assembly process, and also requires additional design space in the door to accommodate such a feature. Further, such components do not have any energy dissipation features that reduce load, so they are stressed instantly during a crash event, which affects robustness of the attachment and the trim piece overall.

SUMMARY

In one embodiment, a trim assembly of a vehicle includes a first component, a second component, and one or more primary retention elements attaching the first component to the second component. A secondary retention element is located at the first component. The secondary retention element is configured to engage the second component only in the event that the first component begins to move away from the second component to prevent release of the first component.

Additionally or alternatively, in this or other embodiments the secondary retention element extends through a secondary retention opening in the second component, and is configured to engage one or more secondary retention tabs of the second component in the event that the first component begins to move away from the second component.

Additionally or alternatively, in this or other embodiments the secondary retention element includes two or more element legs that extend through the secondary retention opening, and a retention hook located at an end of the two or more element legs that engages the one or more secondary retention tabs in the event that the first component begins to move away from the second component.

Additionally or alternatively, in this or other embodiments the two or more element legs define an acute angle therebetween, Additionally or alternatively, in this or other embodiments a leg brace extends between the two or more element legs.

Additionally or alternatively, in this or other embodiments a leg gap is defined between each of the two or more element legs and a respective secondary retention tab of the one or more secondary retention tabs.

Additionally or alternatively, in this or other embodiments a tab gap is defined between the retention hook a tab end of each secondary retention tab of the one or more secondary retention tabs when the first component is attached to the second component via the primary retention elements.

Additionally or alternatively, in this or other embodiments the primary retention elements are one or more of screws or heat stakes.

Additionally or alternatively, in this or other embodiments the one or more screws are installed through the second component and into the first component.

In another embodiment, a door assembly of a vehicle includes a door inner panel, and a door trim assembly installed to the door inner panel. The door trim assembly includes a first trim component, a second trim component, and one or more primary retention elements attaching the first trim component to the second trim component. A secondary retention element is located at the first trim component. The secondary retention element is configured to engage the second trim component only in the event that the first trim component begins to move away from the second trim component to prevent release of the first trim component.

Additionally or alternatively, in this or other embodiments the secondary retention element extends through a secondary retention opening in the second trim component, and is configured to engage one or more secondary retention tabs of the second trim component in the event that the first trim component begins to move away from the second trim component.

Additionally or alternatively, in this or other embodiments the secondary retention element includes two or more element legs that extend through the secondary retention opening, and a retention hook located at an end of the two or more element legs that engages the one or more secondary retention tabs in the event that the first trim component begins to move away from the second trim component.

Additionally or alternatively, in this or other embodiments the two or more element legs define an acute angle therebetween, Additionally or alternatively, in this or other embodiments a leg brace extends between the two or more element legs.

Additionally or alternatively, in this or other embodiments a leg gap is defined between each of the two or more element legs and a respective secondary retention tab of the one or more secondary retention tabs.

Additionally or alternatively, in this or other embodiments a tab gap is defined between the retention hook a tab end of each secondary retention tab of the one or more secondary retention tabs when the first component is attached to the second component via the primary retention elements.

Additionally or alternatively, in this or other embodiments the primary retention elements are one or more of screws or heat stakes.

Additionally or alternatively, in this or other embodiments the one or more screws are installed through the second door trim component and into the first door trim component.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
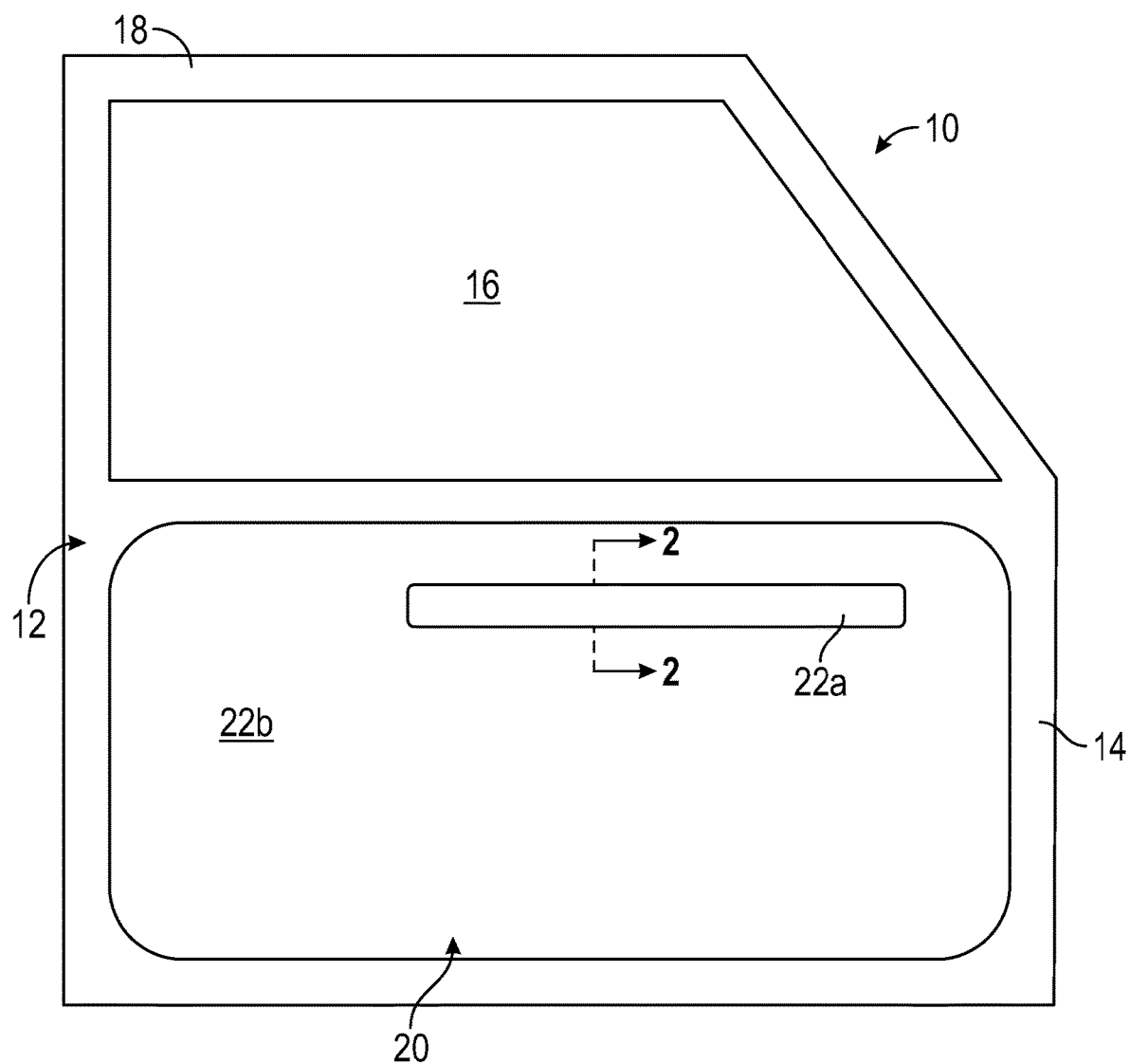
FIG. 1 is an illustration of an embodiment of a door assembly of a vehicle.

The following description is merely exemplary in nature and is not intended to limit the present disclosure, its application or uses. It should be understood that throughout the drawings, corresponding reference numerals indicate like or corresponding parts and features.

In accordance with an exemplary embodiment, illustrated in FIG. 1 is an embodiment of a door assembly 10 of a vehicle. The door assembly 10 includes a door 12 having a door inner panel 14, and in some embodiments at least partially defining a window opening 16 via a door sash 18. In some embodiments, the door inner panel 14 is formed from, for example, stamped metal or composite material, and the door sash 18 is similarly formed from a metal or composite material. A door trim assembly 20 is attached to the door inner panel 14, and includes one or more trim pieces 22 attached directly to the door inner panel 14 and/or attached to other trim pieces 22. The door trim pieces 22 may be formed from, for example, one or more of plastic, fabric, wood, or metal materials.

Figure 2:
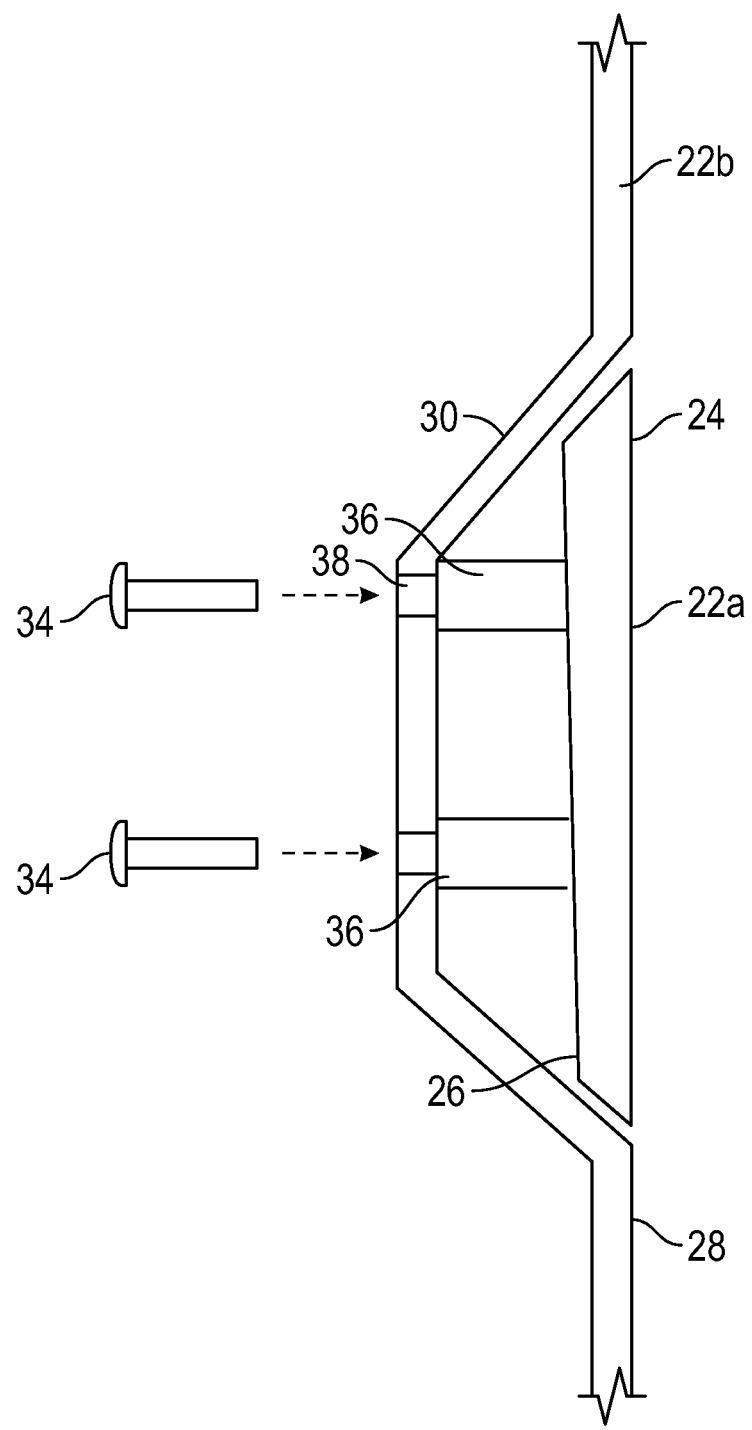
FIG. 2 is a cross-sectional view of an attachment of a trim component to a door assembly.
Figure 3:
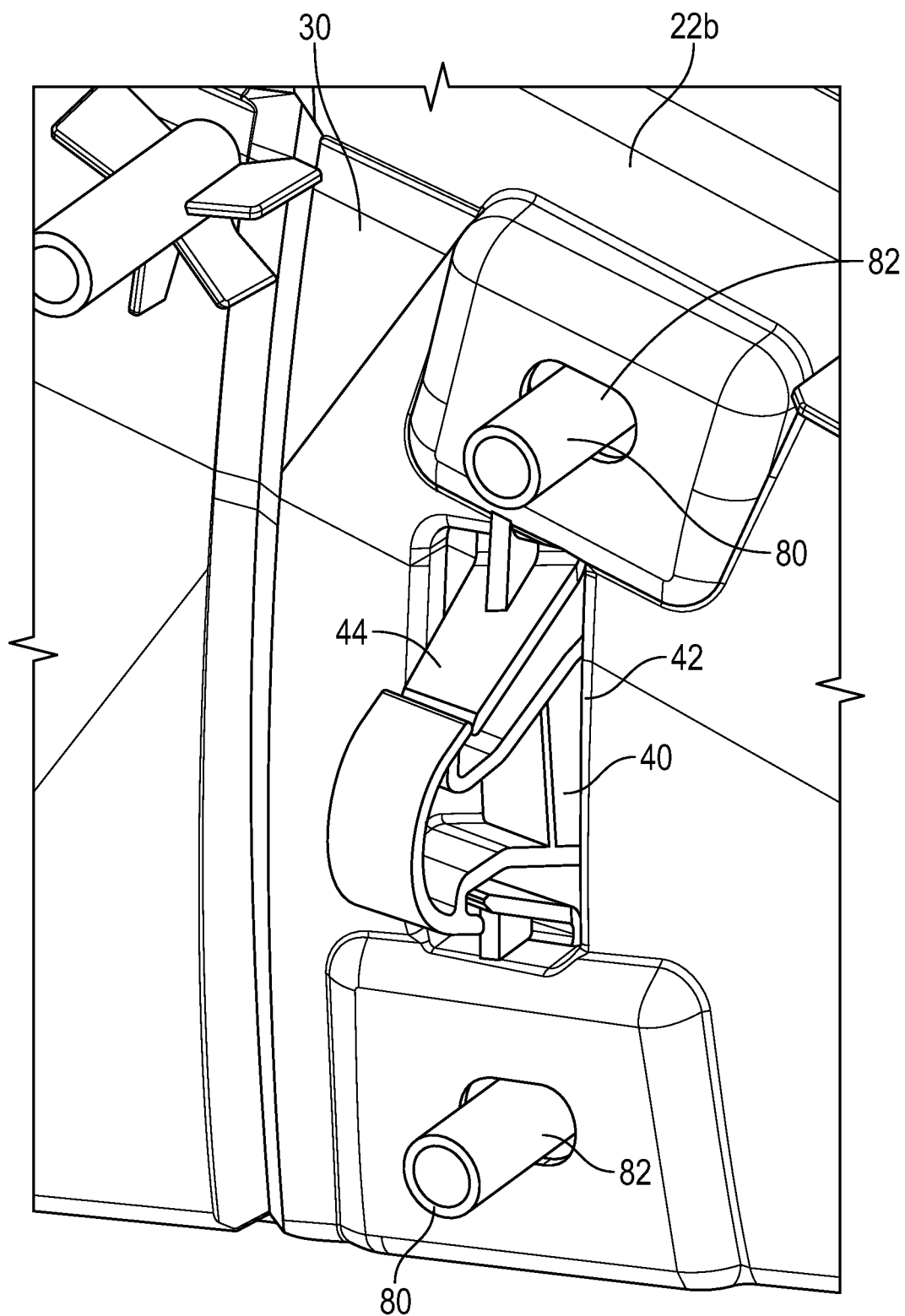
FIG. 3 is an illustration of an attachment of a trim component to a door assembly from a back side of a second trim component including screws.
Figure 3A:
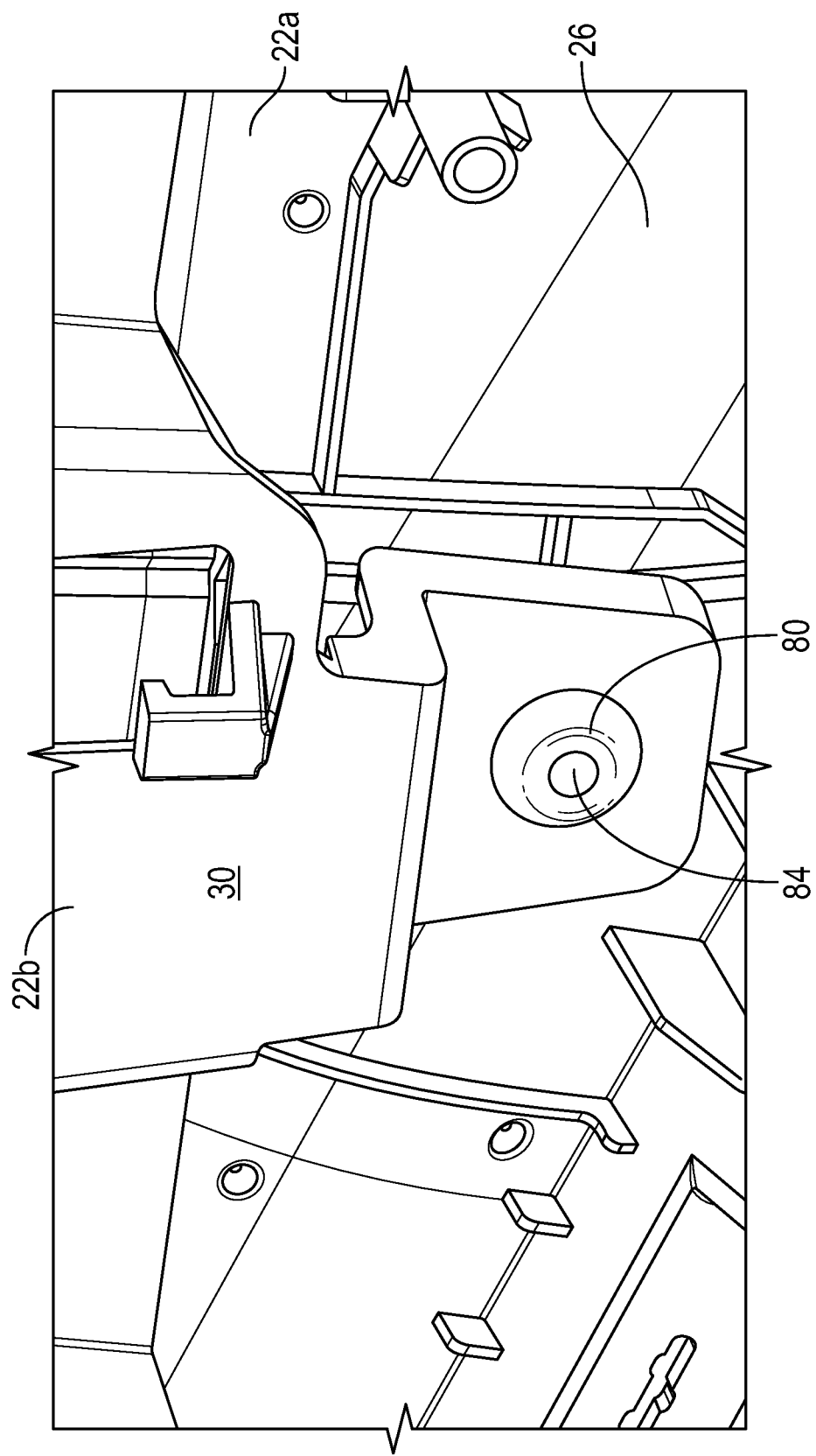
FIG. 3A is another illustration of an attachment of a trim component to a door assembly from a back side of a second trim component including heat stakes.

Referring to FIGS. 2, 3 and 3a, illustrated is an attachment of a first trim piece 22a to a second trim piece 22b. The first trim piece 22a includes a first front surface 24 and a first back surface 26 opposite the first front surface 24. The second trim piece 22b similarly includes a second front surface 28 and a second back surface 30 opposite the second front surface 28. When assembled, the first back surface 26 of the first trim piece 22a abuts the second front surface 28 of the second trim piece 22b. The first trim piece 22a is retained to the second trim piece 22b by one or more primary attachments, for example, one or more screws 34 installed from the second back surface 30 through the second trim piece 22b and into the first trim piece 22a. In some embodiments, the first trim piece 22a includes one or more studs 36 extending from the first back surface 26 into which the one or more screws 34 are installed. In some embodiments, the second trim piece 22b includes one or more screw openings 38 through which the one or more screws 34 are installed. Further, in some embodiments, the one or more studs 36 extend at least partially through the one or more screw openings 38. Further, as shown in FIG. 3a, the primary attachment may additionally or alternatively include one or more heat stakes 80 extending from the first back surface 26 and through a stake opening 82 in the second trim piece 22b. The heat stakes 80 are heated and melted to form a retention cap 84 which retains the second trim piece 22b to the first trim piece 22a.

Figure 4:
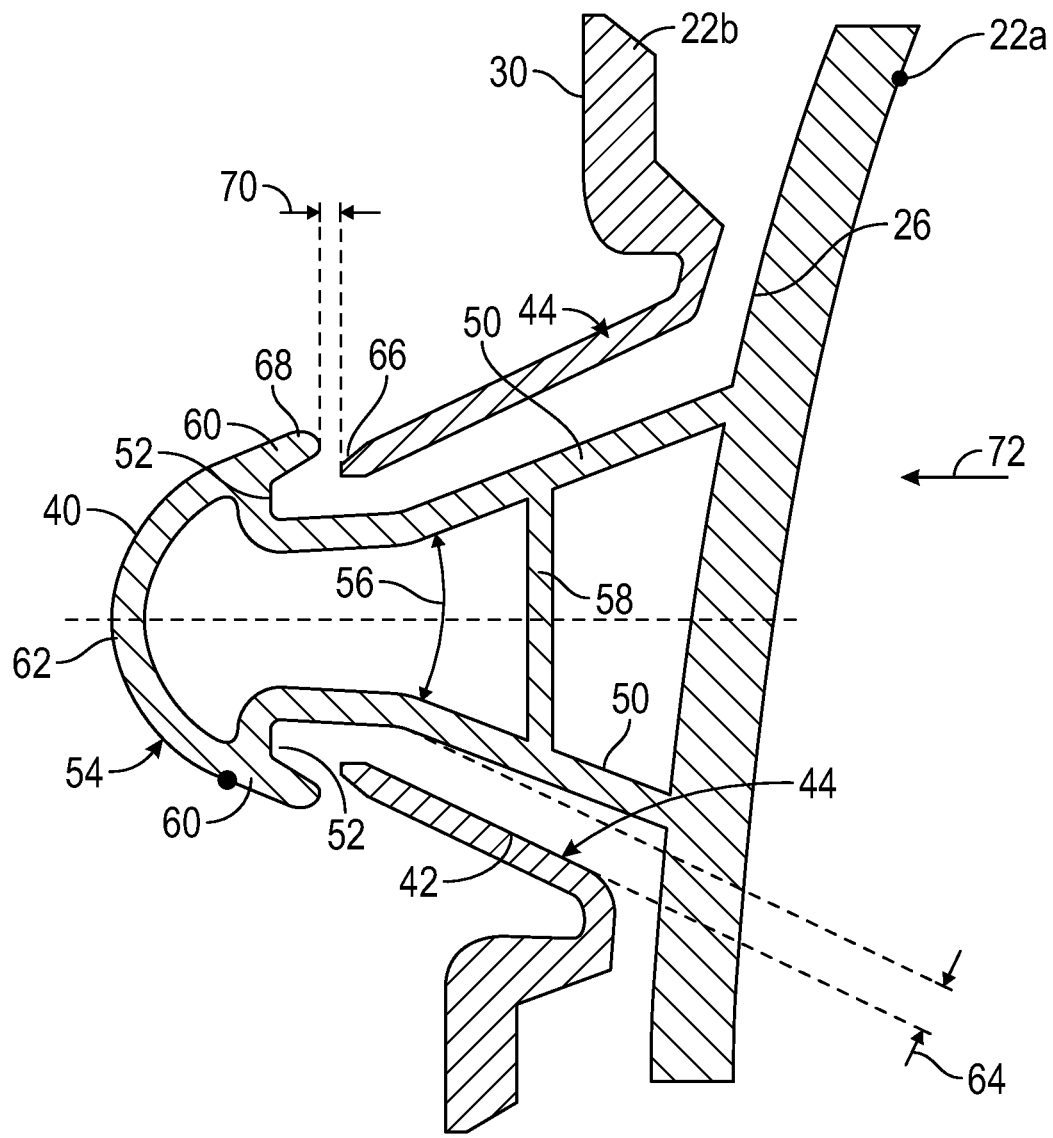
FIG. 4 is another cross-sectional view of an embodiment of a secondary retention element of a trim component.

Referring now to FIG. 4, the first trim piece 22a further includes a secondary retention element 40 installed through a secondary retention opening 42 in the second trim piece 22b. The secondary retention element 40 includes two element legs 50, extending from the first back surface 26 to retention hooks 52 located at an end 54 of the element legs 50. In some embodiments, the element legs 50 define an acute angle 56 therebetween, which may be in the range of 30 degrees to 75 degrees. A leg brace 58 may extend between the element legs 50 to stiffen the secondary retention element 40. The retention hooks 52 include two hook arms 60 extending in opposite directions, one hook arm 60 extending from each element leg 50. In some embodiments, a hook cap 62 extends between the hook arms 60 at the end 54 of the element legs 50, to guide installation of the secondary retention element 40 into and through the secondary retention opening 42, and to also improve stiffness of the secondary retention element 40. In the embodiment of FIG. 4, the hook cap 62 has a continuous constant radius between the hook arms 60, but one skilled in the art will readily appreciate that such a configuration is merely exemplary and that the hook cap 62 may have other shapes.

The secondary retention opening 42 is at least partially defined by secondary retention tabs 44 that extend from the second back surface. In some embodiments, such as shown in FIG. 4, a leg gap 64 is defined between the secondary retention tab 44 and the respective element leg 50 when the secondary retention element 40 is in an installed position in the secondary retention opening 42. The secondary retention tabs 44 each extend to a tab end 66, with the tab end 66 and respective arm end 68 of the hook arm 60 defining a tab gap 70 therebetween in an installation direction 72 of the secondary retention element 40. This tab gap 70 allows energy from, for example, an impact force, to be absorbed by the primary attachments, such as screws 34 (FIG. 2) and/or heat stakes 80 (FIG. 3) and reduces a final amount of energy to be absorbed by the secondary retention tabs 44 in an event of failure of the primary attachments.

Figure 5:
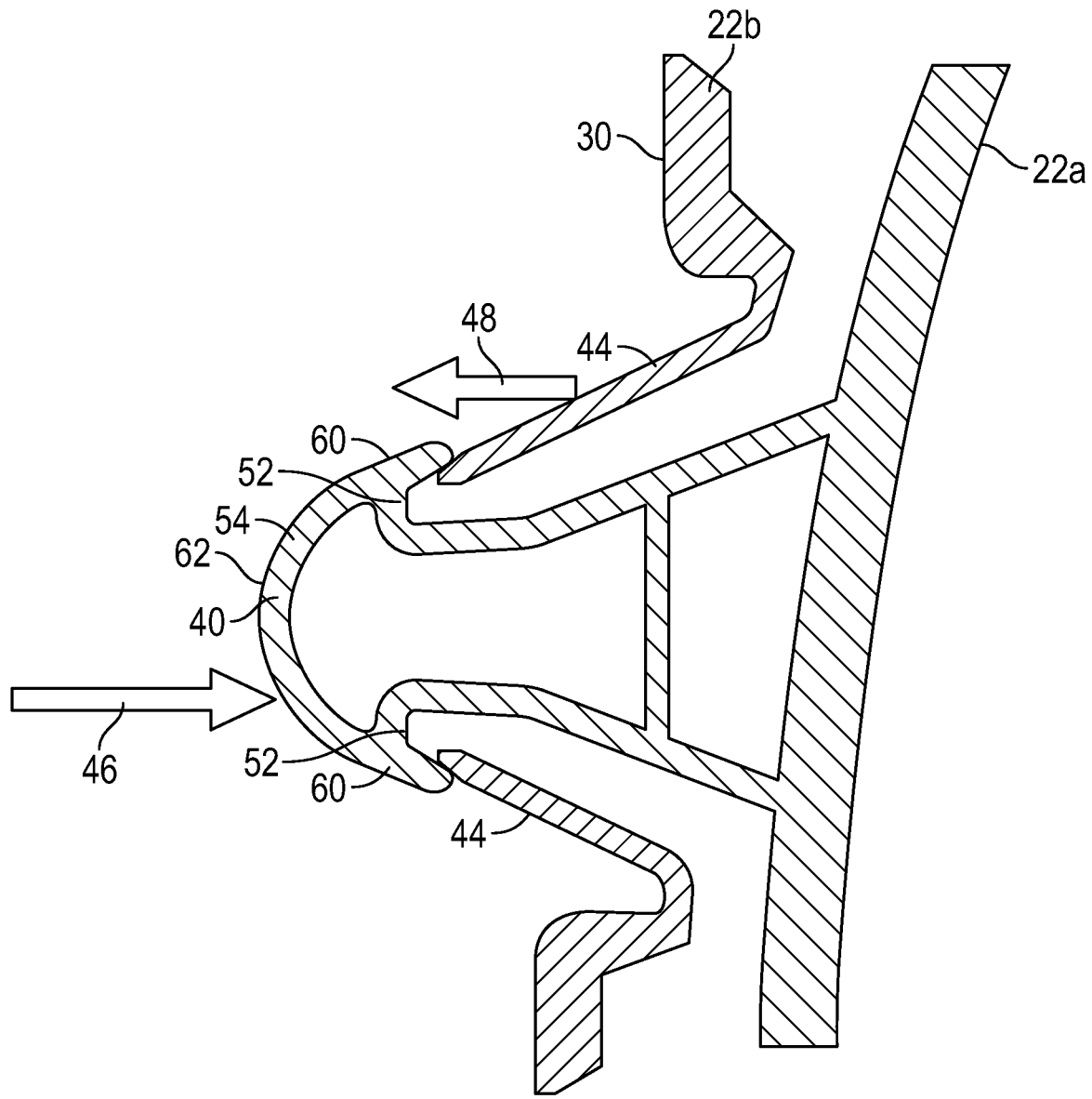
FIG. 5 is a cross-sectional view illustrating operation of the secondary retention element.

In certain conditions, such as failure of the screws 34 and/or heat stake 80 attachments, the retention hooks 52 engage with the secondary retention tabs 44 of the second trim piece 22b. As shown in FIG. 4, during normal vehicle conditions, the secondary retention element 40 does not engage with the secondary retention tab 44. Under certain vehicle conditions, however, such as application of an impact force, the primary attachments may fail, allowing the first trim piece 22a to begin to move away from the second trim piece 22b. Referring to FIG. 5, as the first trim piece 22a begins to move away from the second trim piece 22b the secondary retention element 40, and more particularly the retention hooks 52, engage with the secondary retention tab 44 to prevent release of the first trim piece 22a. More specifically, the secondary retention element 40 applies a compressive force 46 to the secondary retention tab 44, which resists compression with a reactive force 48 to prevent detachment of the secondary retention element 40 from the secondary retention tab 44.

Figure 6:
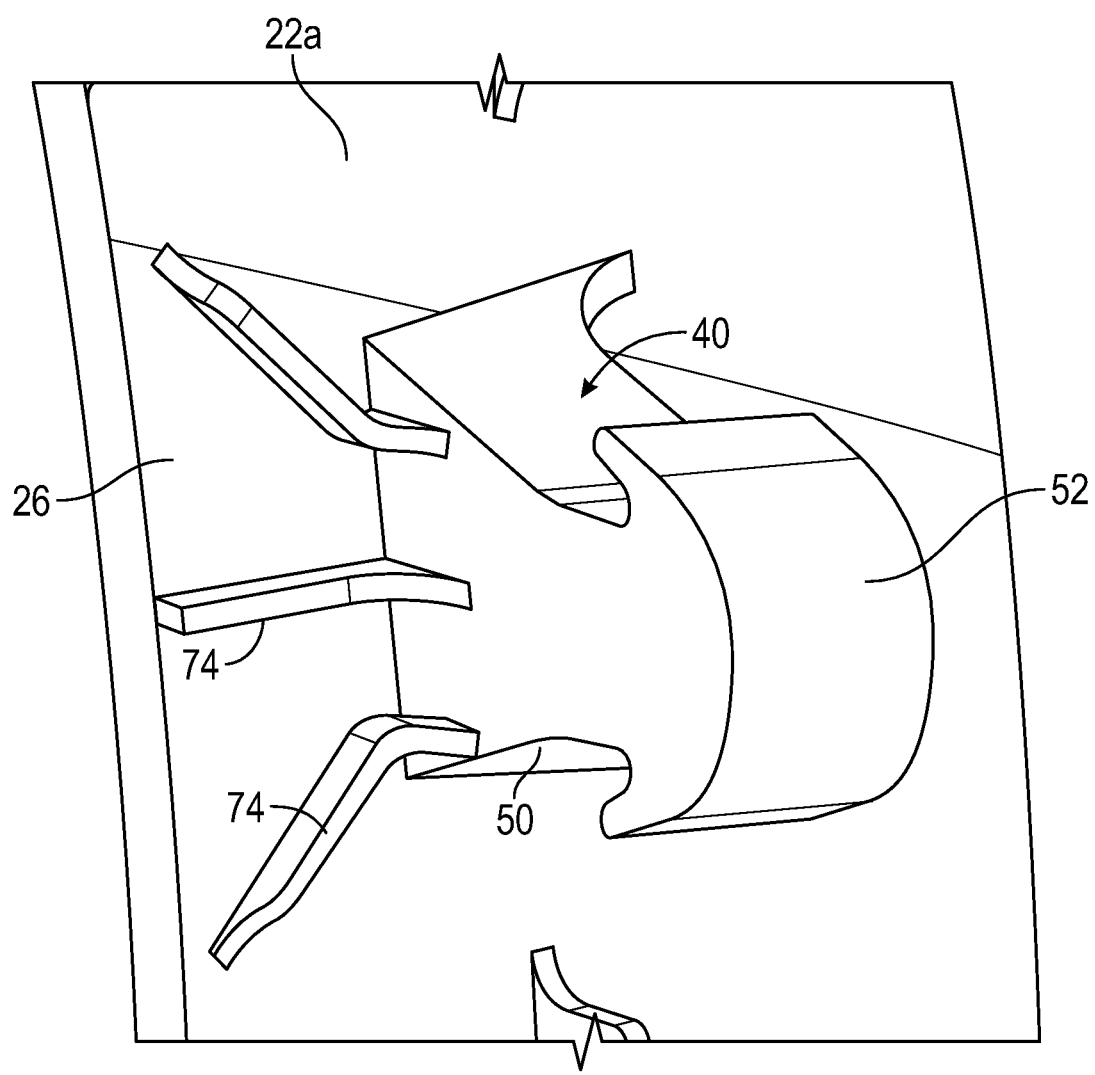
FIG. 6 is an illustration of reinforcing ribs for a secondary retention element.
Figure 7:
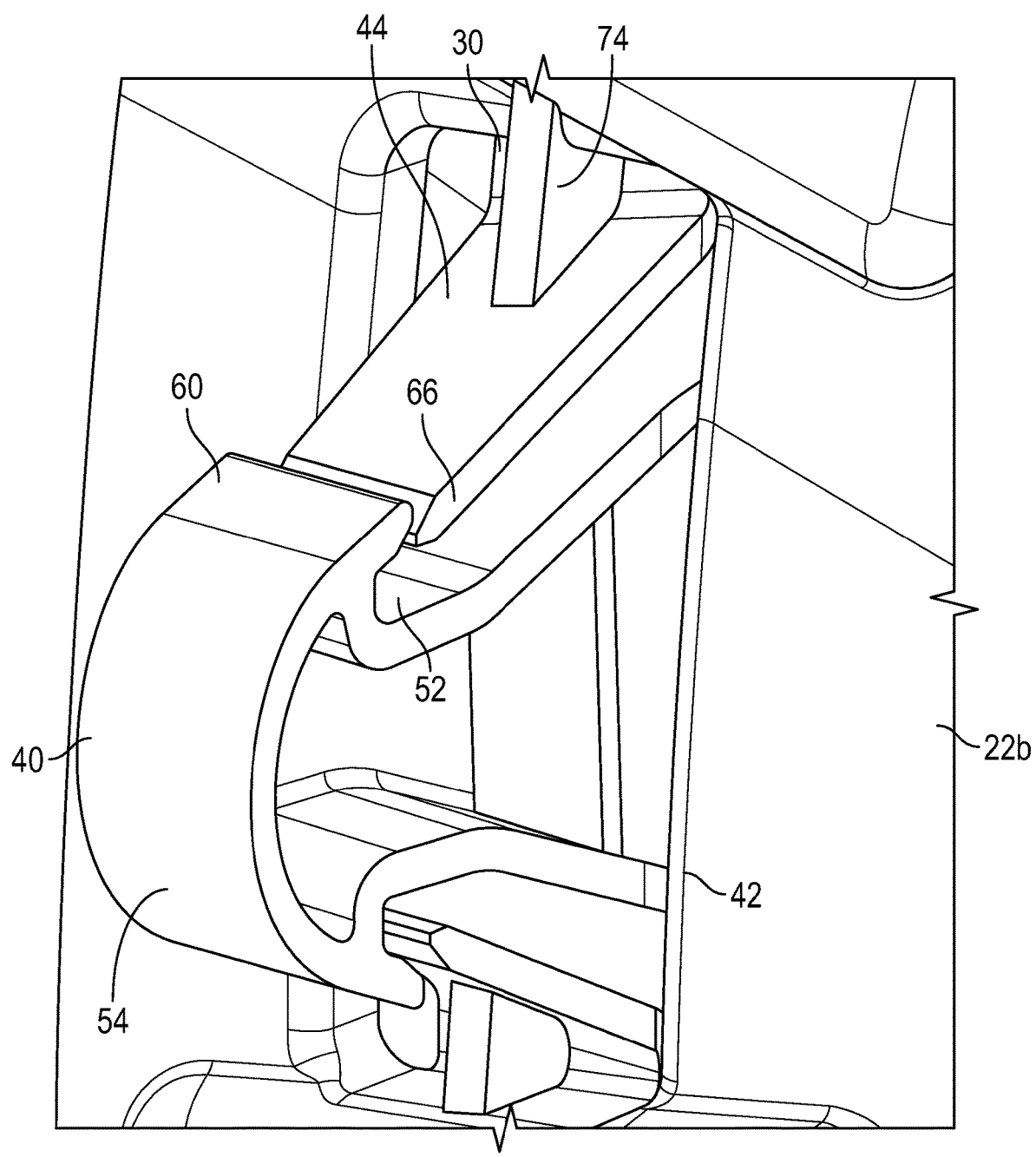
FIG. 7 is an illustration of reinforcing ribs for a secondary retention tab.

Referring now to FIG. 6, in some embodiments, the secondary retention element 40 may include one or more reinforcement ribs 74 extending between the first back surface 26 and the element legs 50 to support the element legs 50. Referring to FIG. 7, in some embodiments, one or more tab ribs 74 extend between the second back surface 30 and the secondary retention tabs 44 to support the secondary retention tabs 44 and aid in providing the desired retention force of the secondary retention tabs 44 and the retention hook 52, which in some embodiments is between 600 and 800 Newtons.

Figure 8:
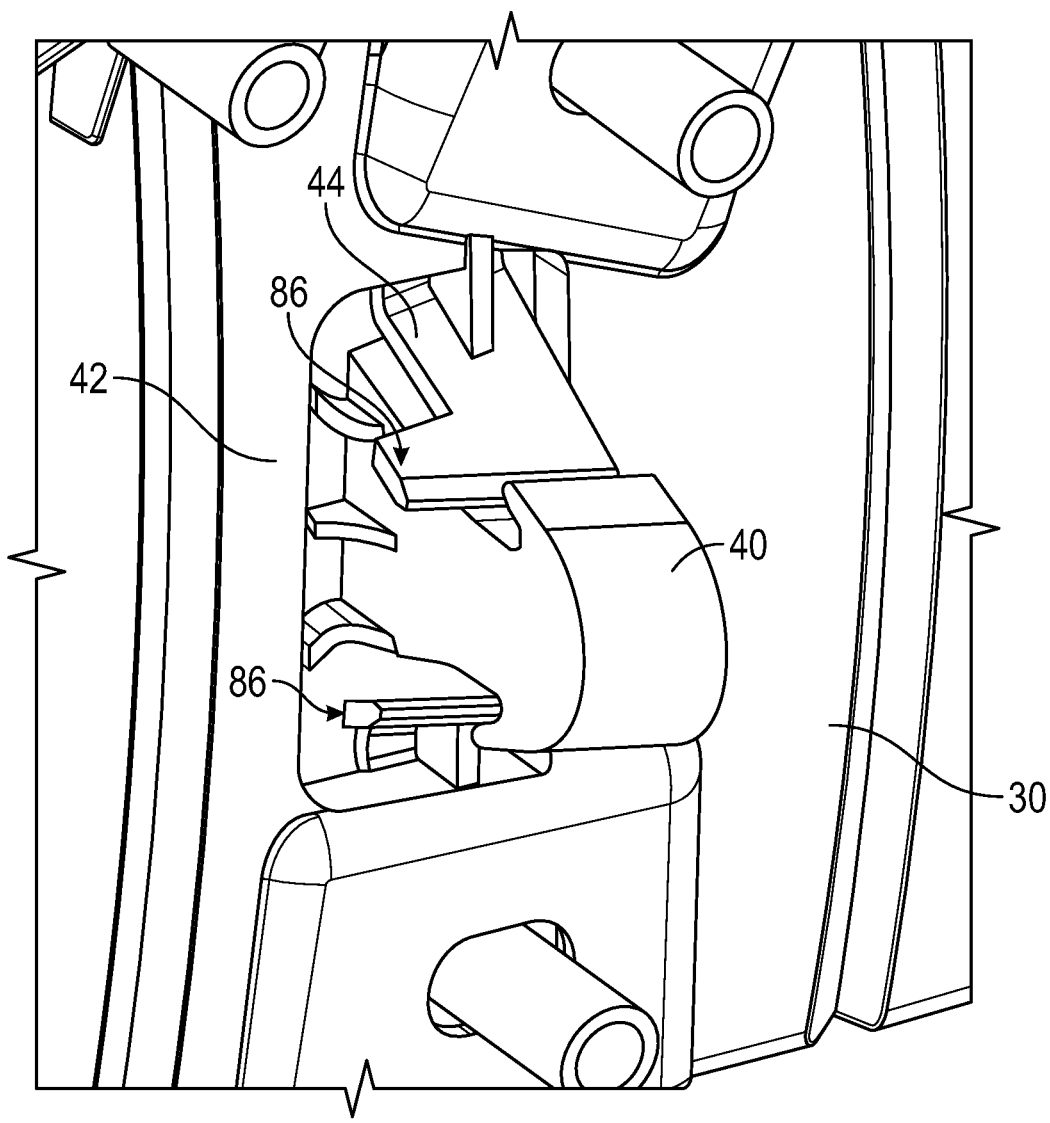
FIG. 8 is an illustration of retention tabs having extended tab hooks.

Referring now to FIG. 8, in some embodiments the retention tabs 44 include a secondary retention hook 86, which laterally extend the retention tabs 44 to allow the retention tabs 44 to be manually flexed by a user or technician. Flexing of the retention tabs 44 allows the first trim piece 22a to be removed from the second trim piece 22b for maintenance or interchangeability.

The secondary retention element 40 configurations disclosed herein provide retention of the trim piece 22a to prevent release of the trim piece 22a under certain vehicle conditions, such as an impact. Further, the secondary retention element 40 has a single installation direction 72 which increases the ease of assembly of the door assembly 10.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A trim assembly of a vehicle, comprising:
a first component;
a second component;
one or more primary retention elements attaching the first component to the second component; and
a secondary retention element disposed at the first component, the secondary retention element configured to engage the second component only in the event that the first component begins to move away from the second component to prevent release of the first component;
wherein the secondary retention element extends through a secondary retention opening in the second component, and is configured to engage one or more secondary retention tabs of the second component in the event that the first component begins to move away from the second component; and
wherein the secondary retention element includes:
two element legs that extend through the secondary retention opening;
a retention hook disposed at a leg end of each of the two element legs and configured to engage the one or more secondary retention tabs; and
a hook cap extending between a first retention hook of a first element leg and a second retention hook of a second element leg.

2. The trim assembly of claim 1, wherein the two or more element legs define an acute angle therebetween.

3. The trim assembly of claim 1, further comprising a leg brace extending between the two or more element legs.

4. The trim assembly of claim 1, wherein a leg gap is defined between each of the two or more element legs and a respective secondary retention tab of the one or more secondary retention tabs.

5. The trim assembly of claim 1, wherein a tab gap is defined between the retention hook and a tab end of each secondary retention tab of the one or more secondary retention tabs when the first component is attached to the second component via the primary retention elements.

6. The trim assembly of claim 1, wherein the primary retention elements are one or more of screws or heat stakes.

7. The trim assembly of claim 6, wherein the one or more screws are installed through the second component and into the first component.

8. A door assembly of a vehicle comprising:
a door inner panel; and
a door trim assembly installed to the door inner panel, the door trim assembly including:
a first trim component;
a second trim component;
one or more primary retention elements attaching the first trim component to the second trim component; and
a secondary retention element disposed at the first trim component, the secondary retention element configured to engage the second trim component only in the event that the first trim component begins to move away from the second trim component to prevent release of the first trim component;
wherein the secondary retention element extends through a secondary retention opening in the second component, and is configured to engage one or more secondary retention tabs of the second component in the event that the first component begins to move away from the second component; and
wherein the secondary retention element includes:
two element legs that extend through the secondary retention opening;
a retention hook disposed at a leg end of each of the two element legs and configured to engage the one or more secondary retention tabs; and
a hook cap extending between a first retention hook of a first element leg and a second retention hook of a second element leg.

9. The door assembly of claim 8, wherein the two or more element legs define an acute angle therebetween.

10. The door assembly of claim 8, further comprising a leg brace extending between the two or more element legs.

11. The door assembly of claim 8, wherein a leg gap is defined between each of the two or more element legs and a respective secondary retention tab of the one or more secondary retention tabs.

12. The door assembly of claim 8, wherein a tab gap is defined between the retention hook a tab end of each secondary retention tab of the one or more secondary retention tabs when the first component is attached to the second component via the primary retention elements.

13. The door assembly of claim 8, wherein the primary retention elements are one or more of screws or heat stakes.

14. The door assembly of claim 13, wherein the one or more screws are installed through the second door trim component and into the first door trim component.

* * * * *